(12) United States Patent
Pressley et al.

(10) Patent No.: US 9,212,292 B2
(45) Date of Patent: Dec. 15, 2015

(54) UREIDO-FUNCTIONALIZED AQUEOUS POLYMERIC DISPERSION

(71) Applicant: Rohm and Haas Company, Philadelphia, PA (US)

(72) Inventors: Ozzie M. Pressley, Cheltenham, PA (US); Wei Zhang, Maple Glen, PA (US); Alvin M. Maurice, Lansdale, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 14/341,892

(22) Filed: Jul. 28, 2014

(65) Prior Publication Data

US 2015/0038644 A1 Feb. 5, 2015

Related U.S. Application Data

(60) Provisional application No. 61/860,012, filed on Jul. 30, 2013.

(51) Int. Cl.

| | |
|---|---|
| *C09D 133/12* | (2006.01) |
| *C08F 220/60* | (2006.01) |
| *C08F 2/22* | (2006.01) |
| *C08F 220/14* | (2006.01) |
| *C08F 2/20* | (2006.01) |

(52) U.S. Cl.
CPC ............... *C09D 133/12* (2013.01); *C08F 2/20* (2013.01); *C08F 2/22* (2013.01); *C08F 220/14* (2013.01); *C08F 220/60* (2013.01)

(58) Field of Classification Search
None
See application file for complete search history.

(56) References Cited

U.S. PATENT DOCUMENTS

| | | | |
|---|---|---|---|
| 4,654,397 A | 3/1987 | Mueller-Mall et al. | |
| 5,021,469 A | 6/1991 | Langerbeins et al. | |
| 5,744,540 A | 4/1998 | Baumstark et al. | |
| 6,552,116 B1 * | 4/2003 | Pakusch et al. | 524/460 |
| 6,617,389 B1 * | 9/2003 | Delaunoit et al. | 524/555 |
| 7,285,590 B2 * | 10/2007 | Holub et al. | 524/460 |
| 2005/0203211 A1 * | 9/2005 | Gebhard | C08F 265/06 523/205 |
| 2012/0301686 A1 * | 11/2012 | Smak et al. | 428/195.1 |

FOREIGN PATENT DOCUMENTS

| | | |
|---|---|---|
| CA | 2829711 A1 | 10/2012 |
| EP | 0609756 A2 | 8/1994 |

* cited by examiner

*Primary Examiner* — Satya Sastri
(74) *Attorney, Agent, or Firm* — Reid S. Willis

(57) ABSTRACT

The present invention relates to a stable aqueous dispersion of acrylic based polymer particles with a first and a second polymeric domain, wherein the first polymeric domain is film-forming at room temperature and the second polymeric domain has a $T_g$ of not less than 35° C., and wherein both polymeric domains include structural units of a ureido monomer. The composition of the present invention addresses a need in the art by providing a composition that is useful as a binder with improved alkyd adhesion properties.

4 Claims, No Drawings

UREIDO-FUNCTIONALIZED AQUEOUS POLYMERIC DISPERSION

BACKGROUND OF THE INVENTION

The present invention relates to a stable aqueous dispersion of polymer particles functionalized with ureido groups.

A common problem associated with aqueous based binders for coatings formulations such as acrylic latexes is adhesion to substrates coated with solvent based alkyd paints. The incompatibility of the two disparate types of coatings results in undesirable peeling of the fresh coat.

It would therefore be an advance in the art to discover a coatings formulation that overcomes the problem of poor adhesion of coating formulations that are incompatible with alkyd coatings.

SUMMARY OF THE INVENTION

The present invention addresses a need in the art by providing a stable aqueous dispersion of polymer particles comprising: 1) from 85 to 98 weight percent of a first polymeric domain comprising, based on the weight of the first polymeric domain, a) from 0.2 to 5 weight percent structural units of a ureido monomer; b) from 0.1 to 3 weight percent structural units of a carboxylic acid monomer; and c) from 30 to 99.4 weight percent structural units of methyl methacrylate and at least one acrylate selected from the group consisting of ethyl acrylate, butyl acrylate, ethylhexyl acrylate, and propylheptyl acrylate; and 2) from 2 to 15 weight percent of a second polymeric domain comprising, based on the weight of the second polymeric domain, a) from 2 to 20 weight percent structural units of a ureido monomer; and b) from 40 to 98 weight percent structural units of methyl methacrylate and at least one acrylate selected from the group consisting of ethyl acrylate, butyl acrylate, ethylhexyl acrylate and propylheptyl acrylate; wherein the first polymeric domain is film forming at room temperature and the second polymeric domain has a $T_g$ of not less than 35° C.

In another aspect the present in invention is a process comprising the steps of polymerizing under emulsion polymerization conditions first monomers comprising, based on the weight of the first monomers, a) from 30 to 50 weight percent methyl methacrylate; b) from 45 to 60 weight percent of an acrylate; c) from 0.1 to 3 weight percent of a carboxylic acid monomer; and d) 0.5 to 2 weight percent of a ureido monomer to form a stable aqueous dispersion of first polymer particles; then contacting, under emulsion polymerization conditions, the stable aqueous dispersion of first polymer particles with an aqueous dispersion of second monomers comprising, based on the weight of the second monomers, a) 65 to 85 weight percent methyl methacrylate; b) 10 to 30 weight percent butyl acrylate; and c) 5 to 15 weight percent of a ureido monomer to form a stable aqueous dispersion of multiphasic polymer particles having a first and a second polymeric domain; wherein the weight percent of first monomers is in the range of 85 to 98 weight percent, and the weight percent of the second monomers is in the range of 2 to 15 weight percent, based on the weight of the first and second monomers; and the first polymeric domain is film forming at room temperature and the second polymeric domain has a $T_g$ of not less than 35° C.

The present invention addresses a need in the art by providing a composition that is useful as a binder with improved alkyd adhesion properties.

DETAILED DESCRIPTION OF THE INVENTION

In a first aspect, the present invention addresses a need in the art by providing a stable aqueous dispersion of polymer particles comprising, based on the weight of the first polymeric domain, 1) from 85 to 98 weight percent of a first polymeric domain comprising: a) from 0.2 to 5 weight percent structural units of a ureido monomer; b) from 0.1 to 3 weight percent structural units of a carboxylic acid monomer; and c) from 30 to 99.4 weight percent structural units of methyl methacrylate and at least one acrylate selected from the group consisting of ethyl acrylate, butyl acrylate, ethylhexyl acrylate, and propylheptyl acrylate; and 2) from 2 to 15 weight percent of a second polymeric domain comprising, based on the weight of the second polymeric domain, a) from 2 to 20 weight percent structural units of a ureido monomer; and b) from 40 to 98 weight percent structural units of methyl methacrylate and at least one acrylate selected from the group consisting of ethyl acrylate, butyl acrylate, ethylhexyl acrylate and propylheptyl acrylate; wherein the first polymeric domain is film forming at room temperature and the second polymeric domain has a $T_g$ of not less than 35° C.

As used herein, the term "structural unit" of the named monomer, refers to the remnant of the monomer after polymerization. For example, a structural unit of methyl methacrylate is as illustrated:

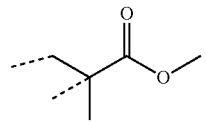

structural unit of methyl methacrylate where the dotted lines represent the points of attachment of the structural unit to the polymer backbone.

As used herein, the term "ureido monomer" refers to a compound containing an acrylate or methacrylate group and a cyclic ureido group (i.e., an imidazolidin-2-one group). Preferred ureido monomers are illustrated below:

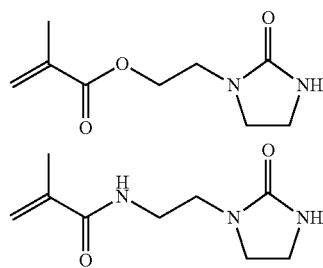

The first polymeric domain is film-forming at room temperature, and preferably has a $T_g$ of not greater than 25° C., more preferably not greater than 20° C., most preferably not greater than 15° C. The difference in $T_g$s between the first and second phases is preferably at least 15 C°, more preferably at least 20 C°.

The first polymeric domain preferably comprises from 30 to 50 weight percent structural units of methyl methacrylate; from 0.1 to 2 weight percent structural units of methacrylic acid; from 45 to 60 weight percent structural units of one or more acrylates selected from the group consisting of ethyl acrylate, butyl acrylate, 2-ethylhexyl acrylate, and 2-propylheptyl acrylate; and preferably from 0.5 to 2 weight percent structural units of a ureido monomer, based on the weight of the first polymeric domain. More preferably, the first polymeric domain comprises methyl methacrylate, butyl acrylate, and ethyl acrylate.

The first polymeric domain preferably further comprises from 0.5 to 5 weight percent structural units of a phosphorus acid monomer such as phosphoethyl methacrylate (PEM); and from 0.5 to 10 weight percent structural units of acetoacetoxyethyl methacrylate, based on the weight of the first polymeric domain.

The second polymeric domain preferably comprises 65 to 85 weight percent structural units of methyl methacrylate; from 10 to 30 weight percent structural units of butyl acrylate; and from 5 to 15 weight percent structural units of a ureido monomer, based on the weight of the second polymeric domain.

The polymer particles can be conveniently prepared by multistage emulsion polymerization, preferably by a 2-stage polymerization process. In a first stage, a first monomer emulsion is reacted under emulsion polymerization conditions to form a stable aqueous dispersion of first polymer particles (that is, the first polymeric domain). In a second stage, a second monomer emulsion is reacted under emulsion polymerization conditions in the presence of the stable aqueous dispersion of the first polymer particles to form the stable aqueous dispersion of particles comprising the first and the second polymeric domains.

The first monomer emulsion is conveniently prepared by mixing together water, emulsifier, methyl methacrylate, one or more acrylates, a ureido monomer, and a carboxylic acid monomer or a salt thereof; and may also include other monomers such as a phosphorus acid monomers, for example PEM and 2-(methacryloyloxy)ethyl phosphonate (MEP) and salts thereof; and an acetoacetoxyalkyl methacrylate such as acetoacetoxyethyl methacrylate (AAEM). The first stage monomer mixture may also include a chain transfer agent such as n-dodecyl mercaptan. The second monomer emulsion can be prepared by mixing together water, methyl methacrylate, an acrylate, and a ureido monomer.

Preferably, the first monomer emulsion comprises from 30 to 50 weight percent methyl methacrylate; from 0.1 to 0.5 weight percent methacrylic acid; from 45 to 60 weight percent of one or more acrylates selected from the group consisting of ethyl acrylate, butyl acrylate, 2-ethylhexyl acrylate, and 2-propylheptyl acrylate; and from 0.2 to 5, more preferably from 0.5 to 2 weight percent of a ureido monomer, based on the weight of total monomers in the first monomer emulsion. The first monomer emulsion also preferably further comprises from 0.5 to 5 weight percent phosphoethyl methacrylate, and from 0.5 to 10 weight percent acetoacetoxyethyl methacrylate, based on the weight of total monomers in the first monomer emulsion. More preferably, the first monomer emulsion comprises methyl methacrylate, butyl acrylate, and ethyl acrylate.

Preferably the second monomer emulsion comprises from 65 to 85 weight percent methyl methacrylate; from 10 to 30 weight percent butyl acrylate; and from 5 to 15 weight percent of a ureido monomer, based on the weight of total monomers in the second monomer emulsion.

Either the first monomer emulsion or the second monomer emulsion or both may include other monomers such as styrene, butyl methacrylate, or vinyl acrylate.

In a second aspect, the present invention is a process comprising the steps of polymerizing under emulsion polymerization conditions first monomers comprising, based on the weight of the first monomers, a) from 30 to 50 weight percent methyl methacrylate; b) from 45 to 60 weight percent of an acrylate, preferably one or more acrylates selected from the group consisting of ethyl acrylate, butyl acrylate, 2-ethylhexyl acrylate, and 2-propylheptyl acrylate; c) from 0.1 to 3 weight percent of a carboxylic acid monomer, more preferably from 0.1 to 2 weight percent methacrylic acid; and d) 0.2 to 5 weight percent, more preferably from 0.5 to 2 weight percent, of a ureido monomer, to form a stable aqueous dispersion of first polymer particles; then contacting, under emulsion polymerization conditions, the stable aqueous dispersion of first polymer particles with an aqueous dispersion of second monomers comprising, based on the weight of the second monomers, a) 65 to 85 weight percent methyl methacrylate; b) 10 to 30 weight percent butyl acrylate; and c) 5 to 15 weight percent of a ureido monomer to form a stable aqueous dispersion of multiphasic polymer particles; wherein the weight percent of first monomers is in the range of 85 to 98 weight percent and the weight percent of the second monomers is in the range of 2 to 15 weight percent, based on the weight of the first and second monomers; and the first polymeric domain is film forming at room temperature, preferably having a $T_g$ of not greater than 25° C., more preferably not greater than 20° C.; and the second polymeric domain has a $T_g$ of not less than 35° C. as measured by the Fox equation.

The stable aqueous dispersion of polymer particles of the present invention is useful as a binder for coatings formulations, which may contain a variety of components including pigments, such as $TiO_2$ and hollow sphere pigments; fillers; dispersants; surfactants; defoamers; preservatives; flow agents; leveling agents; and neutralizing agents.

It has surprisingly been discovered that the presence of ureido functionality in the first and second domains of the polymer particles correlate with improved alkyd adhesion, as the following examples demonstrate.

EXAMPLES

Comparative Example 1

Preparation of a Latex with Ureido Functionality in the First Stage Only

A first monomer emulsion was prepared by mixing deionized water (DI water, 495 g), Disponil FES-993 surfactant (FES 993, 82.5 g, 30% active), butyl acrylate (BA, 456 g), ethyl acrylate (EA, 570 g), methyl methacrylate (MMA, 764.65 g), phosphoethyl methacrylate (PEM, 47.5 g, 60% active), acetoacetoxyethyl methacrylate (AAEM, 38.0 g), methacrylic acid (MAA, 4.75 g), and n-dodecylmercaptan (2.38 g). A second monomer emulsion was prepared by mixing DI water (25 g), FES-993 (2.6 g, 30% active), BA (20 g), and MMA (80 g).

To a 5-L, four necked round bottom flask equipped with a paddle stirrer, a thermometer, $N_2$ inlet, and a reflux condenser was added DI water (700 g) and FES-993 (13.4 g, 30% active). The contents of the flask were heated to 86° C. under $N_2$ with stirring and a solution of Actrene inhibitor (0.30 g, 5% aqueous solution of 4-hydroxy-2,2,6,6-tetramethylpiperidine N-oxide) in DI water (10.0 g) was added to the flask, followed by addition of 8.4% aqueous sodium carbonate (25 g). A portion of the first monomer emulsion (81 g) was then added to the flask followed by addition of 14.8% aqueous ammonium persulfate (NaPS) dissolved (27 g). After the reaction temperature leveled off, a solution of a mixture of 0.15% aqueous ferrous sulfate heptahydrate (19.8 g) and 1% aqueous ethylenediaminetetraacetic acid tetrasodium salt (EDTA, 2.9 g) was added to the flask. Two co-feed solutions were then fed to the flask over a period of 85 min. The first co-feed was a solution of 85% t-amyl hydroperoxide (4.5 g), FES-993 (1.2 g) and DI water (101.0 g); and the second co-feed was a solution of isoascorbic acid (3.08 g) and DI water (105.0 g) (1.17 g/min)

The remaining first monomer emulsion was divided into two portions and fed into the flask according to the following schedule: Two minutes after the start of co-feed addition, a first portion of the remaining first monomer emulsion (930 g) was fed to the flask over 35 min at 86° C.; for the first 10 min of the feed, the feed rate was kept at 15.5 g/min For the remaining 25 min, the feed rate was increased to 31.0 g/min. The second portion of first monomer emulsion (1449.8 g) was mixed with a 45% aqueous solution of KOH (23.5 g) diluted with DI water (50 g). This KOH-neutralized second portion of the first monomer emulsion was then further divided into a 580-g portion and a 943.3-g portion. To the 580.0-g portion was added a solution of ureido methacrylate (UMA, 38.0 g, 50% solution in water) in DI water (25.0 g); the mixture was fed into the flask over 20 min (32.2 g/min) The remaining 943.3-g portion was then fed into the flask over 30 min (31.4 g/min) After the addition of the first monomer emulsion was complete, the emulsion container was rinsed with DI water (30.0 g) and the rinse water was added to the flask. When the co-feed additions were complete, the reaction mixture was held at 86° C. for 15 min, then allowed to cool to 60° C.

The second monomer emulsion was then added to the flask, and the jar containing the emulsion was rinsed with DI water (10.0 g), which was then added to the flask. A solution of t-butyl hydroperoxide (0.5 g, 70% aqueous) in DI water (8 g) was added to the flask followed by addition of a solution of isoascorbic acid (0.4 g) in DI water (12 g). After the exothermic reaction reached peak temperature, a solution of t-butyl hydroperoxide (0.5 g 70%) in DI water (25 g) and a solution of isoascorbic acid (0.5 g) in DI water (25 g) were fed into the flask over 30 min. The reaction mixture was then allowed to cool. A solution of 29% ammonia (31.0 g) in DI water (25 g) was then added to the flask. The temperature was raised to 45° C., at which time the following reagents were added to the flask: DOWEX™ 1x2 CL-16-100 Ion Exchange Resin (120 g, A Trademark of The Dow Chemical Company or Its Affiliates), tetrasodium pyrophosphate (TSPP, 4.5 g), EDTA (3 g), Tamol 983 Dispersant (41.0 g), Rhodafac RS-960 Surfactant (34.6 g), 29% aqueous ammonia (6.2 g), TERGITOL™ 15-S-20 Surfactant (18.75 g, A Trademark of The Dow Chemical Company or Its Affiliates), and DI water (150.5 g). A solution of ACRYSOL™ RM-8W Rheology Modifier (5.0 g, A Trademark of The Dow Chemical Company or Its Affiliates) in DI water (10.0 g) was then added. When the temperature reached 40° C., the following additives were added in the order listed: a solution of Capstone FS-63 Fluorosurfactant (8.57 g) in DI water (10 g), a solution of 3% $KIO_3$ in DI water (14.4 g), a 1% aqueous solution of $Cu(NO_3)_2$ (3.2 g) in DI water (5 g), a solution of ROCIMA™ BT-2S Biocide (10.3 g, 19.2% active, A Trademark of The Dow Chemical Company or Its Affiliates) in DI water (5 g), a solution of KORDEK™ LX-5000 Microbicide (2.1 g, 50% active, A Trademark of The Dow Chemical Company or Its Affiliates) in DI water (25 g), and Tego Foamex 810 Defoamer (0.44 g).

The consequent polymer was then filtered through a 100-mesh screen to remove any gel. The polymer solid, particle size, pH, and Brookfield viscosity were then measured.

Example 1

Preparation of a Latex with Ureido Functionality in First and Second Stage

Example 1 was prepared substantially as shown in Comparative Example 1 except that the second monomer emulsion composition is described in Table 1:

TABLE 1

| Composition of Second Monomer Emulsion | |
|---|---|
| Material | (g) |
| DI Water | 25.0 |
| FES-993 | 2.6 |
| BA | 10.0 |
| Methyl methacrylate (MMA) | 80.0 |
| Ureido Methacrylate (UMA 50% aq. soln) | 20.0 |

Example 2

Preparation of a Latex with Ureido Functionality in First and Second Stages

A first monomer emulsion was prepared by mixing DI water (468 g), FES-993 (76.6 g, 30% active), BA (432 g), EA (540 g), MMA (724.5 g), PEM (45.0 g, 60% active) AAEM (36.0 g), MAA (4.5 g), and n-dodecylmercaptan (2.25 g). A second monomer emulsion was prepared by mixing DI water (52 g), FES-993 (8.5 g, 30% active), BA (20 g), and MMA (160 g), and 50% aqueous UMA (40 g).

To a 5-L, four-necked round bottom flask equipped with a paddle stirrer, a thermometer, $N_2$ inlet, and a reflux condenser was added DI water (700 g) and FES-993 (13.4 g, 30% active). The contents of the flask were heated to 86° C. under $N_2$ and stirring was initiated. A solution of 5% Actrene inhibitor (0.30 g) in DI water (10.0 g) was added to the flask, followed by a solution of sodium carbonate (2.1 g) dissolved in DI water (25 g). A portion of the first emulsion monomer emulsion (81 g) was then added, followed by addition of a 14.8% a solution of NaPS in DI water (27 g). After the reaction temperature leveled off, solution of a mixture of 0.15% aqueous ferrous sulfate heptahydrate (19.8 g) and 1% aqueous EDTA (2.9 g) was added to the flask. Two co-feed solutions were then fed to the flask over a period of 85 min. The first co-feed was a solution of 85% t-amyl hydroperoxide (4.5 g), FES-993 (1.2 g) and DI water (101.0 g); and the second co-feed was a solution isoascorbic acid (3.08 g) and DI water (105.0 g) (1.17 g/min)

The remaining first monomer emulsion was divided into two portions and fed into the flask according to the following schedule: Two minutes after the start of co-feeds, a first portion of the remaining first monomer emulsion (880 g) was fed to the flask over 35 min at 86° C.; for the first 10 min of the feed, the feed rate was kept at 14.7/min For the remaining 25 min, the feed rate was increased to 29.3 g/min. The second portion of first monomer emulsion (1370.3 g) was mixed with a 45% aqueous solution of KOH (23.5 g) diluted with DI water (50 g). The KOH neutralized second portion of the first monomer emulsion was then further divided into a 550-g portion and a 893.3-g portion. To the 550.0-g portion was added a 50% aqueous solution of UMA (36.0 g 50% solution in water) in DI water (25.0 g); and the mixture was fed into the flask over 20 min (30.6 g/min) The remaining 893.3-g portion was then fed into the flask over 30 min (29.8 g/min). After addition of the first monomer emulsion was complete, the emulsion container was rinsed with DI water (30.0 g) and the rinse water was added to the flask. When the co-feeds were complete, the reaction mixture was held at 86° C. for 15 min and then allowed to cool to 60° C.

The second monomer emulsion (Table 2) was added to the flask and the jar containing the emulsion was rinsed with DI water (10.0 g), which was then added to the flask. A solution of t-butyl hydroperoxide (0.5 g, 70% aqueous) in DI water (8 g) was added to the flask followed by addition of a solution of isoascorbic acid (0.4 g) in DI water (12 g). After the exothermic reaction reached peak temperature, a solution of t-butyl hydroperoxide (0.5 g 70%) in DI water (25 g) and a solution of isoascorbic acid (0.5 g) in DI water (25 g) were fed into the flask over 30 min. The reaction mixture was then allowed to cool. A solution of 29% ammonia (31.0 g) in DI water (25 g) was then added to the flask. The temperature was raised to 45° C., at which time the following reagent were added to the flask: DOWEX™ 1x2 CL 16-100 Ion Exchange Resin (120 g), TSPP (4.5 g), EDTA (3 g), Tamol 983 Dispersant (41.0 g), Rhodafac RS-960 Surfactant (34.6 g), 29% aqueous ammonia (6.2 g), TERGITOL™ 15-S-20 Surfactant (18.75 g), and DI water (150.5 g). A solution of ACRYSOL™ RM-8W Rheology Modifier (5.0 g) in DI water (10.0 g) was then added. When the temperature reached 40° C., the following additives were added in the order listed: a solution of Capstone FS-63 Fluorosurfactant (8.57 g) in DI water (10 g), a solution of 3% $KIO_3$ in DI water (14.4 g), an 1% aqueous solution of $Cu(NO_3)_2$ (3.2 g) in DI water (5 g), a solution of ROCIMA™ BT-2S Biocide (10.3 g, 19.2% active) in DI water (5 g), a solution of KORDEK™ LX-5000 Microbicide (2.1 g, 50% active) in DI water (25 g), and Tego Foamex 810 Defoamer (0.44 g).

The polymer was then filtered through a 100 mesh screen to remove any gel. The polymer solid, particle size, pH, and Brookfield viscosity were then measured.

TABLE 2

Composition of Example 2 Second Monomer Emulsion

| Materials | (g) |
| --- | --- |
| Deionized Water | 52.0 |
| FES-993 | 8.3 |
| BA | 20.0 |
| MMA | 160.0 |
| UMA (50%) | 40.0 |

Example 3

Preparation of a Latex with Ureido Functionality in First and Second Stages

Example 3 was prepared using substantially the same process described for Comparative Example 1. The first monomer emulsion (ME1) and second monomer emulsion (ME2) compositions varied according to Table 3. The extra UMA staged in the last 10% of first monomer emulsion was added to the last 10% of first monomer emulsion.

TABLE 3

Monomer Emulsion Compositions for Example 3

| Materials ME1 | (g) | Materials ME2 | (g) |
| --- | --- | --- | --- |
| DI Water | 495 | BA | 40 |
| FES-993 | 82 | MMA | 140 |
| BA | 456 | UMA | 40 |
| MMA | 755 | | |
| EA | 570 | | |
| PEM (60% active) | 48 | | |
| AAEM | 38 | | |
| MAA | 4.8 | | |
| n-DDM | 2.4 | | |
| UMA in middle of ME I | 38 | | |
| UMA in last 10% of ME I | 19 | | |

Paint formulations of Comparative 1 and Examples 1 to 3 were prepared as shown in Table 4a by adding the components to a container in the order listed. The amounts used were the same except for the binder, final water addition, and the rheology modifiers as indicated in Table 4b.

TABLE 4a

Interior Flat Paint Formulation for Comparative Example 1

| Material Name | Weight (g) |
| --- | --- |
| Grind | |
| $TiO_2$ slurry (76% solids) | 280 |
| Propylene Glycol | 10 |
| Water | 50 |
| TAMOL ™ 2011 Dispersant | 12 |
| TERGITOL ™ 15-s-20 Surfactant (20%) | 14 |
| Foamstar A-34 Defoamer | 2.0 |
| AMP ™-95 Co-dispersant | 1 |
| Tetrasodium pyrophosphate | 1 |
| Hexaphos Sodium Hexametaphosphate | 1 |
| Minex 4 extender | 100 |
| Celite 499 extender | 40 |
| Attagel 50 extender | 3 |
| Water | 25 |
| Letdown | |
| Comparative Example 1 | 374 |
| ROPAQUE ™ Ultra E Opaque Polymer | 50 |
| Velate 368 Coalescent | 7 |
| Optifilm Enhancer 400 plasticizer | 1.5 |
| Water | 74 |
| ICI Builder | 56 |
| KU Builder | 6 |

TERGITOL, AMP, ROPAQUE, TAMOL, and ACRYSOL are Trademarks of The Dow Chemical Company or its Affiliates.

Paint formulations prepared with Examples 1-3 (corresponding to Examples 1a-3a), were the same as for Comparative Example 1a, except for the amounts of water in letdown stage as well as ICI and KU builder amounts, as illustrated in Table 4b.

TABLE 4b

Water, Binder, and Rheology Modifiers Used for Formulations

| Binder Example# | Water (g) | Binder (g) | KU Builder (g) | ICI Builder (g) | Formulation Example |
| --- | --- | --- | --- | --- | --- |
| Ex 1 | 71 | 377 | 7 | 55 | Ex 1a |
| Ex 2 | 69 | 378 | 6 | 56 | Ex 2a |
| Ex 3 | 78 | 371 | 6 | 55 | Ex 3a |

Adhesion test panels were prepared by applying a Forest Green high gloss alkyd from Duron Inc. to a black vinyl substrate using a Byk Gardner 7 mil Dow Latex Film Applicator. The alkyd panels air dried in a vented hood for 5 d and were then placed in a controlled temperature and humidity room (72° F. (22.2° C.), 50% Humidity) to continue drying for three months. Formulations for Examples 1a, 2a, 3a and Comparative 1a were then applied individually to an alkyd panel using a Byk Gardner 3 mil Bar Film Applicator and allowed to dry for 24 h.

The ASTM DF-3359 cross hatch tape pull method was used to evaluate adhesion of the dried aqueous coating composition to the alkyd substrate. Table 5 shows the classifications for adhesion test results. Percent area removed refers to the total area of dried alkyd coating removed by the tape.

TABLE 5

Classification of Adhesion Test Results

| Classification | Percent Area Removed |
|---|---|
| 5B | 0% None |
| 4B | Less than 5% |
| 3B | 5-15% |
| 2B | 15-35% |
| 1B | 35-65% |
| 0B | Greater than 65% |

The results of the adhesion test for the Examples and Comparative are shown in Table 6.

TABLE 6

Adhesion Test Results of Examples 1a-3a and Comparative Example 1a

| Example | Adhesion Test Classification Result |
|---|---|
| Example 1a | 4B |
| Example 2a | 5B |
| Example 3a | 5B |
| Comparative Example 1a | 0B |

The paint formulation of Comparative Example 1a shows more than 65% removal of the dried coating; in contrast the compositions that fall within the scope of the present invention show little or no removal of the dried alkyd coating by the ASTM DF-3359 cross hatch tape pull method. The results demonstrate that the presence of ureido functionality in both the first and the second stage of a biphasic two-stage polymer significantly improves alkyd adhesion over the two-stage polymer that has ureido functionality in the first stage only.

Though not bound by theory, it is believed that even small amounts of ureido in a noncompatible relatively high $T_g$ second phase causes improved adhesion through hydrogen bonding between the exposed ureido groups and the alkyd groups.

The invention claimed is:

1. A stable aqueous dispersion of polymer particles comprising:
    1) from 85 to 98 weight percent of a first polymeric domain comprising, based on the weight of first polymeric domain:
        a) from 0.2 to 5 weight percent structural units of a ureido monomer;
        b) from 0.1 to 3 weight percent structural units of a carboxylic acid monomer; and
        c) from 30 to 99.4 weight percent structural units of methyl methacrylate and at least one acrylate selected from the group consisting of ethyl acrylate, butyl acrylate, ethylhexyl acrylate, and propylheptyl acrylate; and
    2) from 2 to 15 weight percent of a second polymeric domain comprising, based on the weight of second polymeric domain:
        a) from 5 to 20 weight percent structural units of a ureido monomer; and
        b) from 40 to 98 weight percent structural units of methyl methacrylate and at least one acrylate selected from the group consisting of ethyl acrylate, butyl acrylate, ethylhexyl acrylate and propylheptyl acrylate;
    wherein the first polymeric domain is film forming at room temperature and the second polymeric domain has a $T_g$ of not less than 35° C.

2. The stable aqueous dispersion of claim 1 wherein the first polymeric domain comprises, based on the weight of first polymeric domain:
    1a) from 30 to 50 weight percent structural units of methyl methacrylate;
    1b) from 45 to 60 weight percent ethyl acrylate, butyl acrylate, or a combination thereof;
    1c) from 0.5 to 2 weight percent structural units of a ureido monomer;
    1d) from 0.1 to 2 weight percent structural units of a carboxylic acid monomer;
    wherein the carboxylic acid monomer is methacrylic acid; and the ureido monomer is represented by either or both of the following structures:

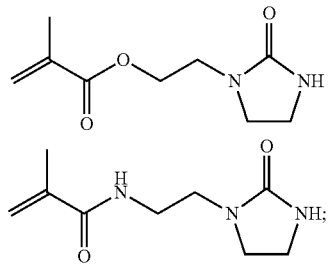

and wherein the second polymeric domain comprises, based on the weight of second polymeric domain:
    2a) from 5 to 15 weight percent structural units of a ureido monomer;
    2b) from 65 to 85 weight percent structural units of methyl methacrylate; and
    2c) from 10 to 30 weight percent structural units of butyl acrylate;
    wherein the $T_g$ of the first polymeric domain is not greater than 20° C.

3. The stable aqueous dispersion of claim 2 wherein the first polymeric domain further comprises 0.5 to 5 weight percent structural units of phosphethyl methacrylate; and from 0.5 to 10 weight percent structural units of acetoacetoxyethyl methacrylate, based on the weight of the first polymeric domain.

4. A method comprising the steps of:
    1) polymerizing under emulsion polymerization conditions first monomers comprising, based on the weight of the first monomers, a) from 30 to 50 weight percent methyl methacrylate; b) from 45 to 60 weight percent of an acrylate; c) from 0.1 to 3 weight percent of a carboxylic acid monomer; and d) 0.5 to 2 weight percent of a ureido monomer to form a stable aqueous dispersion of first polymer particles; then
    2) contacting, under emulsion polymerization conditions, the stable aqueous dispersion of first polymer particles with an aqueous dispersion of second monomers comprising, based on the weight of the second monomers, a) 65 to 85 weight percent methyl methacrylate; b) 10 to 30 weight percent butyl acrylate; and c) 5 to 15 weight percent of a ureido monomer to form a stable aqueous dispersion of multiphasic polymer particles having a first and a second polymeric domain; wherein the weight percent of first monomers is in the range of 85 to 98 weight percent and the weight percent of the second monomers is in the range of 2 to 15 weight percent, based on the weight of the first and second monomers;

and the first polymeric domain is film forming at room temperature and the second polymeric domain has a $T_g$ of not less than 35° C.

* * * * *